United States Patent [19]

Bradford

[11] 4,077,566
[45] Mar. 7, 1978

[54] NIGHT SETBACK-MORNING READY CONTROL SYSTEM FOR UNIT VENTILATORS

[75] Inventor: George J. Bradford, York, Pa.

[73] Assignee: International Telephone and Telegraph Corporation, Nutley, N.J.

[21] Appl. No.: 659,398

[22] Filed: Feb. 19, 1976

[51] Int. Cl.² .................. F24F 11/00; F23N 5/20
[52] U.S. Cl. ............................ 236/46 C; 165/16; 236/51; 307/236; 340/310 A; 361/191
[58] Field of Search ............... 340/172, 310 A, 176; 236/47, 46 R, 51; 165/12, 16; 317/137; 307/2, 236; 361/191, 193; 328/118

[56] References Cited

U.S. PATENT DOCUMENTS

| 2,992,366 | 7/1961 | Veltfort, Jr. ............... 340/172 X |
| 3,260,899 | 7/1966 | Green ............................. 317/137 |
| 3,622,994 | 11/1971 | Schoenwitz ................. 340/163 X |
| 3,626,370 | 12/1971 | Stubbs .............................. 340/163 |
| 3,753,184 | 8/1973 | Holloway et al. ................. 165/16 |
| 3,964,023 | 6/1976 | Fauchez ...................... 340/310 A |
| 3,964,676 | 6/1976 | Rooks et al. .................. 236/47 X |
| 3,972,471 | 8/1976 | Ziegler ......................... 236/46 R |

OTHER PUBLICATIONS

Multiple Use Control Lines, Relay Engineering — Struthers–Dunn, Inc. 1940.
Radio Electronics; Switching Tricks With Diodes, pp. 54 & 55; May, 1972.

*Primary Examiner*—William E. Wayner
*Attorney, Agent, or Firm*—John T. O'Halloran; Peter C. Van Der Sluys

[57] ABSTRACT

The invention provides a system for transmitting operational command signals to one or more remote unit ventilator units from a master control panel. A number of selected command signals corresponding to operational modes such as occupied day, night setback, morning ready and load shedding modes may be transmitted over a two-wire electrical transmission line to which the remote units are parallelly connected. The remote units receive and respond to the command signals by initiating the commanded mode.

17 Claims, 3 Drawing Figures

NIGHT SETBACK-MORNING READY CONTROL SYSTEM FOR UNIT VENTILATORS

BACKGROUND OF THE INVENTION

1. Field of the Invention

The present invention relates generally to temperature control systems and more particularly to a system having means for controlling the operational mode of remotely located unit ventilators.

2. Description of the Prior Art

In unit ventilator type temperature control systems individual self-contained operating units are disposed in each room of a building. It has become the common practice to provide a master control panel for controlling the operational modes of the unit ventilators. Three modes of operation are generally provided as follows: night setback, morning warm-up and occupied day. During the night setback mode of operation, the temperature set point is reduced by up to 20 degrees below the daytime temperature set point, the outside air dampers are closed and the mechanical refrigeration is disabled. During the morning warm-up mode of operation only the daytime temperature set point is reinstated, the outside air dampers remain closed and the mechanical refrigeration remains disabled. During the occupied day mode of operation, the daytime temperature set point controls the system, both heating and refrigeration are allowed to operate as required, and the outside air dampers are opened to introduce fresh air to the rooms.

Most prior art devices used pneumatic temperature control systems for controlling the three modes of operation by providing three pressure levels that are sensed at the unit ventilators by pressure responsive relays which initiate the desired mode of operation. Refinements to the three-pressure level type pneumatic control systems have been made so that two pressure levels in conjunction with a pulsed drop in pressure may be used to control the three modes of operation.

In general, all pneumatic control type systems required a high initial installation cost since pneumatic tubing or piping systems had to be directed throughout an entire building.

It is apparent that the three-pressure level type of pneumatic control systems require sophisticated and accurate control devices for providing accurate and non-fluctuating pressure levels to supply lines. Sensitive pressure relays that operate only within narrow pressure ranges are also required. Thus, the three-pressure level type systems were relatively expensive and were sensitive to fluctuations in control pressure.

The refined two-pressure level type systems alleviated some of the problems encountered with accurate pressure control and pressure fluctuations; however, more sophisticated pressure receiving equipment was required that could respond to pressure pulses of certain magnitudes and durations.

Electrical control systems that did not require the expensive installation of pneumatic tubing were provided for controlling the operational modes of remote unit ventilators. These electronic systems were either complex systems requiring sophisticated and expensive control circuitry for detecting coded command signals or large conventional systems using a number of clock-operated relays and a transmission cable having a wire pair for each of the modes of operation.

With the advent of the energy crisis and the limited electrical energy supply in many areas, it has become desirable to provide an additional operating mode for unit ventilators wherein either a heating or cooling load may be partially shed during "brownouts" when electric utility companies experience critical overload conditions. The prior art devices could not provide this additional control mode without a substantial increase in cost and sophistication of the control systems which would require additional pairs of wires in electronic control systems or the provision of additional pressure levels in pneumatic control systems.

SUMMARY OF THE INVENTION

The present invention contemplates an electrical control system for controlling the operational mode of one or more heating, ventilating or air-conditioning units from a control panel. This novel system has the advantage of a low initial installation cost while providing for the control of up to four operational modes, such as occupied day, night setback, morning ready and load shedding modes.

Through the use of unique but simple transmitting and receiving circuitry, control signals for four operational modes may be transmitted over a two-wire transmission line which may be inexpensively run throughout an entire building with the unit ventilators being connected in parallel to the two-wire transmission line. The signals used for the four operational modes are as follows: no signal; full-wave a.c.; positive d.c.; and negative d.c. Thus, the system has been designed so as not to require the sensing of a plurality of specific signal levels as in the prior art devices which were very sensitive to fluctuations in electrical power. The invention uniquely uses four distinctly different signals that may easily be detected without the need for complex circuitry.

A receiving section in each unit ventilator receives the signals from the two-wire system and through logic circuitry, provides an output signal at a particular one of four terminals so that the desired operational mode is initiated.

The primary objective of the present invention is to provide a simple low-cost system for controlling the mode of operation of one or more unit ventilators.

Another objective of the present invention is to provide a mode controlling system for unit ventilators that is not sensitive to voltage fluctuations.

Another objective of the present invention is to provide an operational mode control system for unit ventilators that has increased mode control capability while using only a two-wire transmission line.

Other objectives and advantages will appear in the following description which, when considered in conjunction with the accompanying drawings, set forth three embodiments of the present invention.

DESCRIPTION OF THE INVENTION

The invention will be described as controlling unit ventilators as an example, but it is to be understood that the invention may be used to provide operational command signals to any type of remotely controlled system where up to four signals are required and a two-wire transmission line is available. It is to also be understood that while the invention will be described as providing for the control of four distinct operational modes, the invention may easily be practiced for the control of any lesser number of operating modes and in particular, the conventional heating, ventilation and air-conditioning modes of occupied day, night setback, and morning ready.

Figure 1:
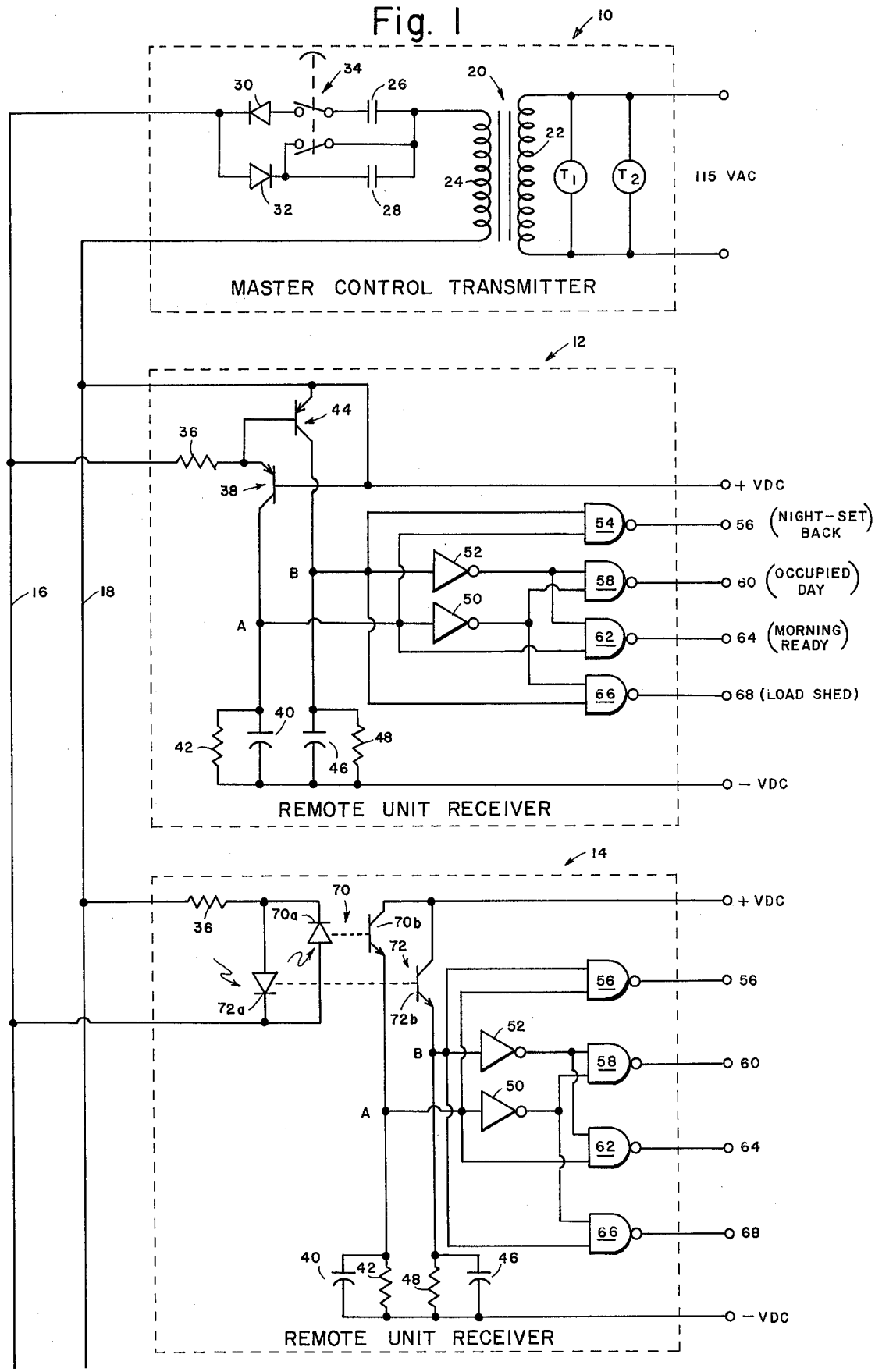
FIG. 1 is a schematic drawing showing the transmitting and receiving portions of the present invention.

Referring to FIG. 1, there is shown a master control transmitter 10 which may be located in a separate control panel or in one of the unit ventilators used in a temperature control system. The master control panel 10 is connected to remote unit receivers 12 and 14 through a pair of transmission wires 16 and 18 to which the remote unit receivers are parallelly connected. Wire 16 provides a signal to the remote unit receiver while wire 18 is merely a return line. Throughout the application, reference will be made to a two-wire system; however, it is to be understood that this could be one wire if a good interconnect ground were used to replace wire 18.

Referring to the master control transmitter 10, which may be located in a separate control panel or in one of the unit ventilators of the system, there is provided a low-voltage transformer 20 having a primary winding 22 connected across a source of 115 volts a.c. and a secondary winding 24 which provides a low voltage output such as 24 volts a.c. Timing clocks $T_1$ and $T_2$ are connected across the 115 volt a.c. source and have normally open contact pairs 26 and 28 respectively. It is to be understood that timers $T_1$ and $T_2$ could be combined into a single timer having two sets of contact pairs; however, two separate timers have been shown in the drawing since, as a practical matter, two timers each with a single contact pair are cheaper than one timer with two contact pairs. One end of the secondary winding 24 of transformer 20 is connected directly to wire 18 of the two-wire transmitting system, while the other end of the secondary winding of transformer 20 is connected to one contact of each of the contact pairs 26 and 28. The other contact of contact pair 26 is connected to an anode of a diode 30, while the other contact of contact pair 28 is connected to a cathode of a diode 32. A cathode of diode 30 and an anode of diode 32 are connected to wire 16 of the two-wire transmission line.

A double pole switch 34 may be included in the master control transmitter for the purpose of manually providing a load shedding command signal. The double pole switch has a pair of normally closed contacts connected between diode 30 and contact pair 26 and a normally open pair of contacts connected across the contact pair 28.

Figure 3:
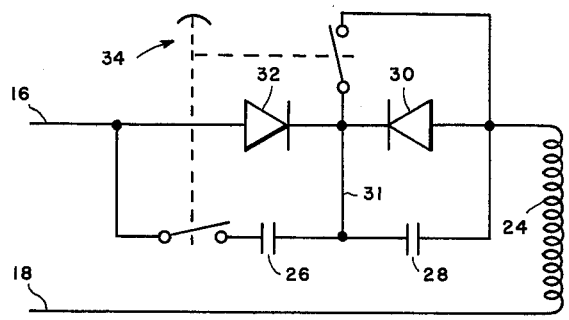
FIG. 3 is a schematic of an alternate embodiment of a transmitter for use with the present invention.

Referring to FIG. 3, there is shown an alternate embodiment for the master control transmitter 10 wherein the contact pairs 26 and 28 are connected in series and the diodes are also connected in series with their cathodes connected. The series connected diodes are in parallel with the contact pairs and a jumper connects the cathodes of the diodes with the connection between the contacts. Switch 34 is connected to short out contact pair 28 and open contact pair 26 in a manner similar to that shown in FIG. 1.

As an example of the operation of the master control transmitter, clocks $T_1$ and $T_2$ may be set so that contact pairs 26 and 28 both close at 5:00 P.M., which is normally the end of a working day to initiate night setback. Clock $T_2$ may be set to open contact pair 28 at 6:30 A.M. to initiate the morning ready mode, while $T_1$ may be set to open contact pair 26 at 8:30 A.M. to initiate the occupied day operation. Switch 34 is provided to manually initiate load shedding when necessary. During the period between 8:30 A.M. and 5:00 P.M. when contact pairs 26 and 28 are open, no signal is provided to wires 16 and 18 and this zero signal condition corresponds to the occupied day operation. At 5:00 P.M. when contact pairs 26 and 28 both close, a 24 volt a.c. signal is transmitted over lines 16 and 18. This signal corresponds to the night setback mode of operation. At 6:30 A.M., contact pair 28 opens so that only a positive half-wave d.c. signal is provided to wires 16 and 18 and this signal corresponds to the morning ready mode of operation. At 8:30 A.M. when contact pair 26 again opens, the system reverts back to the occupied day operation with no signal being provided to the wires 16 and 18. In the event that load shedding is required, switch 34 is moved from its normal position so that contact pair 28 is shorted and the contact pair in series with contact pair 26 opens so that a negative half-wave d.c. signal is provided to wires 16 and 18, which corresponds to a load shedding mode of operation.

The circuitry for the master control transmitter 10 has been described in an embodiment that provides for four distinctly different signals corresponding to operational modes for a unit ventilator. In the event that only three command signals are required, the circuit may be simplified by elimination of the switch 34 and diode 32 so that three distinctly different signals would be provided as follows: no signal, full-wave a.c. or positive half-wave d.c. signal. It will be apparent to one skilled in the art that any combination of less than four signals may be used by charging the contact closing sequence or by the elimination of certain diodes.

The remote unit receiver 12 shown in FIG. 1 illustrates one embodiment of a remote unit receiver design that may be used with the present invention. Remote unit receiver 12 has a resistor 36 connected between wire 16 and an emitter element of a PNP transistor 38. Transistor 38 has a base element connected to a positive d.c. potention +VDC and a collector element connected to a negative d.c. potential −VDC through a parallel connection of a capacitor 40 and a resistor 42. A transistor 44 also of the PNP type has an emitter element connected to wire 18 and to the base element of transistor 38 and is therefore biased at the +VDC potential. Transistor 44 also has a base element connected to the emitter element of transistor 38 and a collector element connected to the −VDC negative potential through a parallel connection of a capacitor 46 and a resistor 48. The positive and negative potentials +VDC and −VDC may have a level in the order of 6 volts, however, the exact level is not critical in the practice of the invention provided it is less than the peak level of the a.c. signal from secondary 24 of transformer 20.

When no signal is provided on lines 16 and 18 during the occupied day operation, both transistors 38 and 44 remain in a cut-off condition thereby isolating the +VDC potential from the capacitors 40 and 46. Any residual charge remaining on capacitors 40 and 46 will be bled off through resistors 42 and 48 respectively so that ultimately the −VDC potential will be present at points A and B. When the contact pairs 26 and 28 both close during the night setback mode of operation, a full-wave a.c. signal appears on wires 16 and 18, which signal will cause transistors 38 and 44 to alternately switch on and off with transistor 38 conducting on the positive half cycle of the a.c. signal and transistor 44 conducting on the negative half cycle of a.c. signal. When the transistors conduct the +VDC potential is alternately connected to capacitors 40 and 46 which charge to the +VDC voltage level. The time constant of capacitor 40 and resistor 42 and capacitor 46 and resistor 48 is such that the capacitors will not substantially discharge during the non-conducting period of their respective charging transistors so that the +VDC voltage may be developed on the capacitors. Thus, during the night setback mode of operation, both capacitors are charged so that a positive potential appears at both points A and B.

During the morning ready mode of operation when contact pair 26 is closed and contact pair 28 is opened only a positive half-wave d.c. signal is transmitted over wires 16 and 18. The signal causes transistor 38 to conduct during the positive half-waves, while transistor 44 remains cut off. Since transistor 44 is cut off, capacitor 46 discharges through resistor 48 so that the −VDC potential appears at point B. The periodic conducting of transistor 38 keeps capacitor 40 charged so that +VDC potential remains at point A. During a load shedding mode of operation, a negative half-wave d.c. signal is provided to the wires 16 and 18, which causes transistor 38 to remain cut off, but causes transistor 44 to alternately conduct during the negative half-waves. The conduction of transistor 44 causes capacitor 46 to charge to the +VDC potential, while capacitor 40 discharges through resistor 42 to the −VDC potential. Thus, point A has a −VDC potential and point B a +VDC potential.

Referring to the transistors 38 and 44, it is to be noted that the bases are connected to the emitters of the other transistor. Using this type of connection the voltage across a reverse biased base-emitter junction never exceeds the forward voltage drop across a forward biased emitter-base junction and the transistors are protected.

If a +VDC voltage is equated with a logic level 1 and a −VDC voltage is equated with a logic level zero, the four modes of operation may be represented by the four binary numbers comprising the combinations of one's and zero's that appear at points A and B.

Using logic elements, the four binary numbers at points A and B may be converted to four combinations of signals at four separate output terminals. Point A is connected to the input of an inverter 50, while point B is connected to the input of an inverter 52. A NAND-gate 54 has first and second inputs connected respectively to points A and B and an output connected to a terminal 56. A NAND-gate 58 has first and second inputs connected to outputs of inverters 50 and 52 and an output connected to a terminal 60. A NAND-gate 62 has a first input connected to the output of inverter 52 and a second input connected to point A and an output connected to a terminal 64. A NAND-gate 66 has a first input connected to an output of inverter 50 and a second input connected to point B and an output connected to a terminal 68.

With the previously mentioned logic elements connected as shown and described, during the night setback mode of operation when an a.c. signal is provided to the transmission wires 16 and 18, a one-level logic signal is provided at points A and B. The one-level signals are applied to the inputs of NAND-gate 54 so that the NAND-gate provides a zero level output to terminal 56. The remaining NAND-gates each have at least one input connected to an output of one of the inverters 50 and 52 so that a zero level signal is applied to the inputs, and the outputs to terminals 60, 64 and 68 are at the one-level. During the occupied day mode of operation when no signal is provided to the transmission wires 16 and 18, a zero level logic signal is provided at points A and B and these zero level signals are inverted by inverters 50 and 52 so that one-level signals are provided at both inputs of NAND-gate 58 so that a zero level output is provided to terminal 60. Each of the other NAND-gates has at least one input with a zero level input signal applied thereto and therefore one-level signals are provided to terminals 56, 64 and 68. In like manner, during the morning ready mode of operation when positive half-wave signals are provided to transmission wires 16 and 18, a one-level logic signal is provided at point A and a zero level logic signal is provided at point B. Thus, one-level signals are provided at both inputs to NAND-gate 62 so that a zero level signal is provided at terminal 64 during the morning ready mode of operation. During a load shedding mode of operation, a zero level signal is provided at terminal 68 while one-level signals are provided at terminals 56, 60 and 64.

Thus, for each of the possible four operating modes, one of the four terminals is provided with a zero level signal, while the other terminals have provided thereon a one-level signal.

It is to be noted that in the remote unit receiver 12 the +VDC potential is connected to wire 18 and therefore the d.c. bias runs throughout the building and the units are all electrically connected. It may be desirable to have the units electrically isolated from each other and an embodiment of a receiver that accomplishes this is shown in FIG. 1 as remote unit receiver 14. The transistors 38 and 44 have been replaced with optical couplers 70 and 72, with the remainder of the circuit being substantially identical to that of remote unit receiver 12. The optical coupler 70 has a light emitting diode 70a optically coupled to a light sensitive transistor 70b. In like manner coupler 72 has a diode 72a and transistor 72b. The optical couplers provide an advantage in that the positive potential +VDC remains isolated from the transmission wires 16 and 18 and each unit is electrically isolated from another. The optical couplers may be of the type sold under the trade name of Litronix, Model ILD 74. The operation of optical couplers 70 and 72 is similar to that of transistors 38 and 44 in that the transistors 70b and 72b do not conduct when a zero signal is provided to the transmission wires 16 and 18 and they both conduct when an a.c. signal is provided to the transmission wires. When a positive half-wave d.c. signal is provided, transistor 70b is caused to conduct and when a negative half-wave d.c. signal is provided, transistor 72b conducts so that 0 and 1 level signals are provided at points A and B as in remote unit receiver 12.

Figure 2:
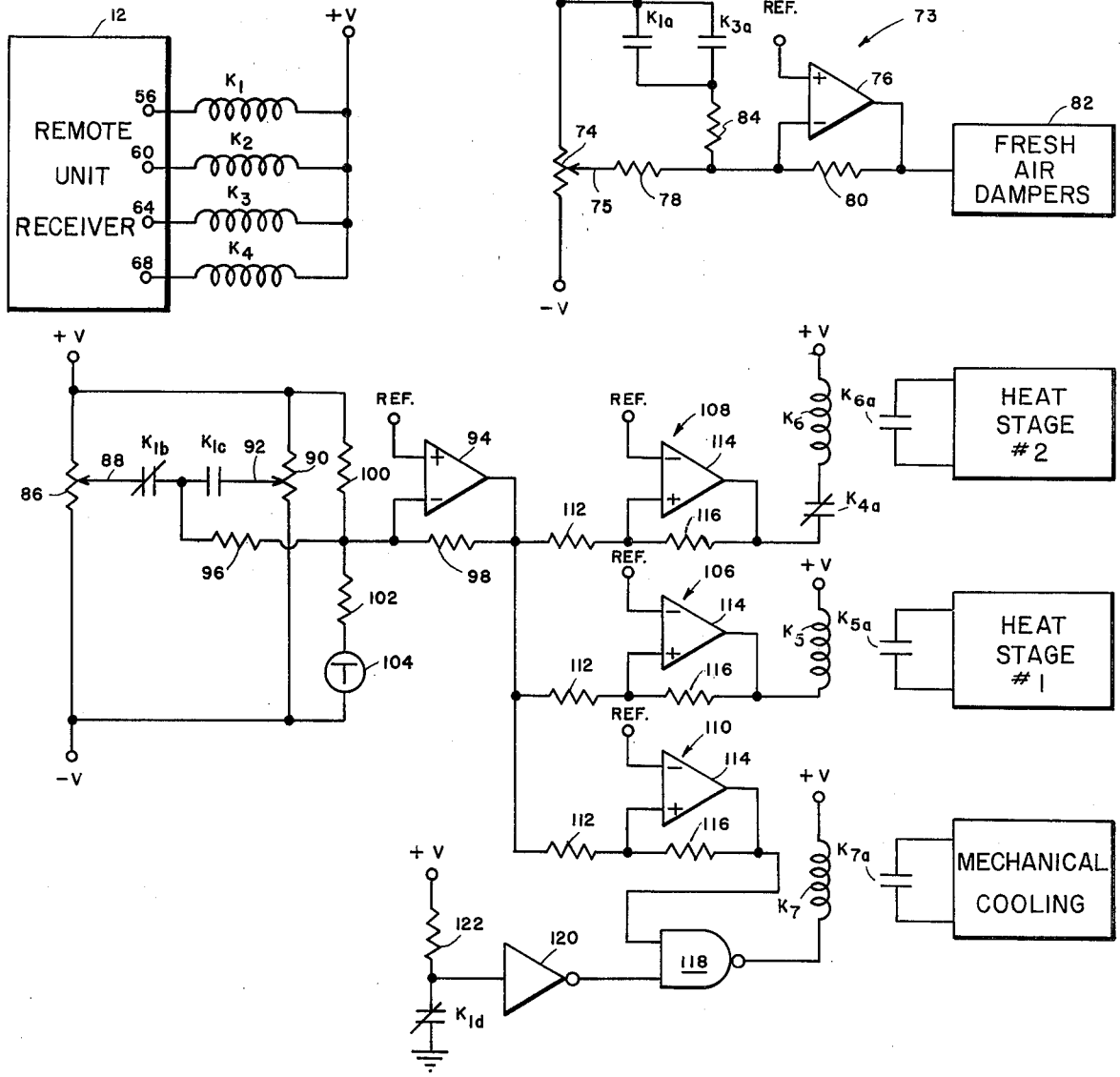
FIG. 2 is a schematic drawing showing the interconnection between a unit receiver and the control circuitry of a unit ventilator.

Referring to FIG. 2, there is shown how the remote unit receiver 12 is connected to the control circuitry of a unit ventilator system. The terminals 56, 60, 64 and 68 are respectively connected to one lead of relay coils K1, K2, K3 and K4, which have their other leads commonly connected to a positive potential +V. Relay coils K1 through K4 are low-power sensitive relays that may be operated within the power output capability of the NAND-gates used in the remote unit receivers. A 1 level signal at an output terminal has a sufficient positive potential so that the associated relay remains de-energized.

Referring now to the fresh air damper control circuit 73 of the unit ventilator, a potentiometer 74 is connected between positive and negative potentials +V and −V respectively and includes a wiper arm 75 which may be positioned to select a minimum percentage of fresh air to be delivered to a room during operation of the unit ventilator. Wiper arm 75 is connected to an inverting input of an operational amplifier 76 through a resistor 78. Operational amplifier 76 is a standard 741 type operational amplifier and has a non-inverting input connected to a reference signal which may be zero volts. Operational amplifier 76 has an output which is connected to the inverting input by way of a feedback resistor 80. The output of operational amplifier 76 provides a control signal to a fresh air damper system 82 of the unit ventilator. Contact pairs K1a of relay K1 and K3a of relay K3 are connected in parallel and have one contact thereof connected to a positive potential +V and the other contact thereof connected to the inverting input of amplifier 76 through a resistor 84. When relays K1 and K3 are not energized, the normally open pairs of contacts K1a and K3a have no effect on circuit 70 and the fresh air dampers 82 are driven to a position as selected by wiper arm 75 on potentiometer 74. However, when either of relays K1 or K3 are energized, such as during the night setback or morning ready modes of operation, contact pairs K1a or K3a are closed, thereby connecting the positive potential +V to the inverting input of amplifier 76 through resistor 84, which potential is sufficient to provide an output at amplifier 76 to drive the fresh air dampers 82 to a closed position.

A potentiometer 86 is connected between positive and negative potentials +V and −V and has a wiper arm 88 which may be adjusted to select a daytime temperature set point. A potentiometer 90 is also connected between the positive and negative potentials and has a wiper arm 92 which may be adjusted to select a nighttime temperature set point. Wiper arm 88 of potentiometer 86 is connected to the inverting input of an amplifier 94 through a normally closed contact pair K1b of relay K1 and through a resistor 96. A pair of normally opened contacts K1c of relay K1 are disposed between the wiper arm 92 of potentiometer 90 and the point of connection between resistor 96 and contact pair K1b. Amplifier 94 is a standard operational amplifier of the 741 type and has a non-inverting input connected to a reference potential which may be zero volts. Amplifier 94 also has an output which is connected back to the inverting input through a feedback resistor 98. A resistor 100 is connected between the positive potential +V and the inverting input of amplifier 94, while a series connected resistor 102 and a temperature sensor 104 are connected between a negative potential −V and the inverting input of amplifier 94. The temperature sensor 104 may be a negative temperature coefficient thermistor which increases resistance when subjected to a decrease in sensed temperature. Thermistor 104 is disposed in a location where it is subjected to the room temperature.

The operation of the circuits thus far described is such that when heat is required either because of an increase in a temperature set point by the movement of wiper arm 88 or 92 or by a sensed reduction in room temperature, the output from amplifier 94 moves in a negative direction to provide a negative output signal. In like manner, if a reduction in heat or mechanical cooling is required, either because of a reduction in the temperature set point or because of a sensed increase in room temperature, the output of amplifier 94 will increase to provide a positive output signal.

The signals from the output of amplifier 94 are connected to the inputs of threshold trigger circuits 106, 108 and 110. Each of said trigger circuits includes an input resistor 112 for connecting the signal from amplifier 94 to a non-inverting input of an operational amplifier 114 of the 741 type. The operational amplifier has an output which is connected back to the non-inverting input through a resistor 116 for providing positive feedback thereto. Each of the operational amplifiers 114 has an inverting input connected to a reference signal. The reference signal for the trigger circuit 106 may be zero volts d.c. so that any negative signal at the output of amplifier 94 will result in a negative output signal from the operational amplifier 114. The reference signal connected to the trigger circuit 108 may preferably be a negative reference signal so that the trigger will not provide a negative output until a larger negative signal is provided by amplifier 94. Thus, trigger circuits 106 and 108 will trigger successively at different level output signals from amplifier 94, rather than simultaneously. The reference signal for trigger circuit 110 may preferably be a positive d.c. level so that a positive output from amplifier 94 will have to increase to a certain threshold level before the output amplifier 114 switches from negative to positive level.

A coil of a relay K5 is connected between a positive potential +V and the output of the trigger circuit 106 so that the relay K5 is activated when the circuit initially calls for heat and the output of trigger circuit 106 goes negative. Relay K5 has a pair of contacts K5a which are normally open and are connected to a Heat Stage No. 1 of a unit ventilator system. The Heat Stage No. 1 is activated when relay K5 is energized. The coil of a relay K6 is connected between a positive potential +V and the output of trigger 108 through a normally closed pair of contacts K4a of relay K4 so that relay K6 is activated when additional heat is called for by a more negative signal being provided at the output of amplifier 94. Relay K6 has a pair of normally open contacts K6a connected to a Heat Stage No. 2 for activating the heat stage when additional heat is called for. During the load shedding mode when terminal 68 has a zero logic level output, relay K4 is energized so that the normally closed contacts K4a are opened, thereby de-energizing relay K6 and shutting off the Heat Stage No. 2 thereby conserving energy that would be consumed by the additional heat stage.

The output of the trigger circuit 110, which is normally at a low level, is connected to a first input of a NAND-gate 118. NAND-gate 118 has a second input connected to an output of an inverter 120 which has an input connected to ground through a normally closed pair of contacts K1d of relay K1. The input of inverter 120 is also connected to a positive potential +V through a resistor 122, which supplies a positive level or logic level one signal to the input of inverter 120 when contacts K1d of relay K1 open during the night setback mode of operation. The coil of a relay K7 is connected between a positive potential +V and the output of NAND-gate 118 and has a pair of contacts K7a which are normally opened and are connected to a mechanical cooling portion of the unit ventilator. During normal daytime operation when relay K1 is de-energized, the input of inverter 120 is at ground or logic level zero and therefore, the inverter provides a one level signal to the NAND-gate 118. When the output signal from amplifier 94 goes positive by a sufficient amount to overcome the threshold level set in trigger 110, the output of trigger 110 goes positive so that the NAND-gate 118 provides a zero level output signal which energizes relay K7 and initiates mechanical cooling. During the night setback mode of operation when relay K1 is energized, it is desirable that the mechanical cooling be disabled and this is provided by opening contacts K1d so that a positive or one-level signal is seen at the input of inverter 120 and the inverter provides a zero level signal to the input of the NAND-gate 118 so that the output of NAND-gate 118 is at a one level and prevents energization of the relay K7, thereby disabling mechanical cooling.

If it is desirable not to have the mechanical cooling activated during the morning ready period, then rather than disabling the cooling during the night setback mode, it may be advisable to enable the cooling only during the occupied day mode when relay K2 is energized. In such a case, contacts K1d would be replaced with a pair of normally open contacts controlled by relay K2 so that the input of inverter 120 would be grounded to a zero logic level during the occupied day mode of operation.

It is to be understood that the invention may be used in place of the relays. The relays have been used in the description only because their operation is easier to describe and illustrate.

Thus, the present invention provides an inexpensive and simplified means for controlling the operational mode of one or more unit ventilators which may be remotely located. The system is simple and inexpensive to install since it only requires the installation of a two-wire transmission line throughout the building. Using the unique transmitter circuit distinctly different and easily detectable command signals are transmitted over the two-wire system. When used to control a plurality of unit ventilators, the transmission system may be used to transmit command signals from a master control transmitter for controlling operational modes, of the unit ventilator, such as occupied day, night setback, morning ready and if desired, a load shedding. The system, while being less complex and less expensive than those of the prior art devices, is not sensitive to voltage fluctuations or pneumatic pressure fluctuations as were the devices of the prior art.

Thus, the present invention decreases the actual cost of the control system, decreases the installation cost and improves reliability and performance of the system.

What is claimed is:

1. A temperature control system, comprising:
a master control transmitter for transmitting selected command signals during predetermined periods of time, said command signals corresponding to occupied day operation, night setback operation, and morning ready operation and being selected from a group of signals comprising, a substantially zero level signal, an a.c. signal, a positive d.c. signal and a negative d.c. signal;
a temperature control apparatus including means for tempering air within an enclosure and means for delivering fresh outside air to said enclosure, said temperature control apparatus being responsive to the occupied day operation command signal for providing fresh air to the enclosure and for maintaining the enclosure at a selected day temperature set point, and being responsive to the night setback command signal for prohibiting the entrance of fresh air into the enclosure and for maintaining the enclosure at a night temperature set point and being responsive to the morning ready command signal for preventing the introduction of fresh air into the room while maintaining the room temperature at the day temperature set point.

2. A temperature control system as described in claim 1, wherein the master control transmitter additionally transmits a command signal corresponding to a load shedding mode of operation and the temperature control apparatus responds to said signal to reduce the temperature controlling capability of the apparatus.

3. A temperature control apparatus for a room including:
means for tempering the air in the room;
means for providing fresh ventilation air to the room;
means for receiving mode control signals from a transmission line, said receiving means comprising first means having an output for providing a first signal in response to a first polarity signal from the transmission line and for providing a second signal in response to the absence of a first polarity signal for a predetermined period of time, and second means having an output for providing a third signal in response to a second polarity signal from the transmission line and for providing a fourth signal in response to an absence of a second polarity signal for a predetermined period of time; and
control means responsive to the first, second, third and fourth signals for controlling the means for tempering the air within the room and the means for providing fresh air to the room.

4. A night setback-morning ready control system for a temperature control apparatus, comprising:
command signal transmitting means for selectively transmitting one of at least three operational control signals selected from a group of signals comprising, a signal having a level below a predetermined threshold, an a.c. signal having a level above the threshold, a positive d.c. signal having a level above the threshold and a negative signal having a level above the threshold; and
command signal receiving means connected to said transmitting means for receiving said transmitted signal and being responsive thereto for providing one of at least three control signals for the temperature control apparatus whereby a selected one of at least three operational modes of the temperature control apparatus may be initiated.

5. A control system of the type that provides command signals from a transmitter to a receiver, said system comprising:
a.c. signal receiving means for receiving an a.c. signal;
transmitting means for providing a transmitted signal;
first switch means disposed between said a.c. signal receiving means and said transmitting means for selectively connecting said transmitting means to said a.c. signal receiving means;
first rectifier means in parallel with the first switch means;
second switch means disposed in series with said first switch means, whereby a transmitted signal from a group of signals including a substantially zero level signal, an a.c. signal, and a d.c. signal may be provided by selectively setting said first and second switch means; and receiving means for receiving the transmitted signals, said means having first and second outputs for providing one of first and second level signals at the first output in response to a first polarity transmitted signal and for providing the other of said level signals at the first output in response to the absence of a first polarity transmitted signal for a predetermined period of time and for providing one of the first and second level signals at the second output in response to a second polarity transmitted signal and the other of said level signals in the second output in response to the absence of a second polarity transmitted signal for a predetermined period of time, whereby the first and second outputs of the receiving means provide combinations of first and second level signals in response to the signals provided by the transmitting means.

6. An apparatus as described in claim 5, additionally comprising second rectifier means connected in parallel with the second switch means, whereby the transmitted signal may be selected from a group of four distinctly different transmitted signals including, zero level, a.c., positive d.c. and negative d.c.

7. A control system of the type that provides command signals from a transmitter to a receiver, said system comprising:
   transmitting means for selectively transmitting signals having different polarities;
   receiving means for receiving the transmitted signals, said receiving means having first and second outputs each including a capacitive storage means, a switching means responsive to a predetermined polarity of received signal for connecting a first potential to the capacitive storing means, and means for controllably discharging said capacitive storage means and biasing said storage means to a second potential after said storage means is discharged, whereby the first output provides a first potential in response to a first polarity received signal and a second potential in response to the absence of a first polarity received signal for a predetermined period of time and the second output in response to a second polarity received signal provides a first potential and a second potential in response to the absence of a second polarity received signal for a predetermined period of time so that the first and second outputs of the receiving means provide combinations of first and second potentials in response to the signals provided by the transmitting means.

8. An apparatus as described in claim 7, wherein the switching means each comprise a transistor biased to be turned on by the predetermined polarity of received signal.

9. An apparatus as described in claim 9, wherein the transistor of the first means has a base element connected to an emitter element of the transistor of the second means and the base element of the transistor of the second means is connected to the emitter element of the transistor of the first means.

10. An apparatus as described in claim 7, wherein the switching means comprises an optically coupled transistor whereby the apparatus is electrically isolated from the source of the received signals.

11. A control system of the type that provides command signals from a transmitter to a receiver, said system comprising:
   transmitting means for selectively transmitting signals having different polarities;
   receiving means for receiving the transmitted signals, said means having first and second outputs for providing one of first and second level signals at the first output in response to a first polarity received signal and for providing the other of said level signals at the first output in response to the absence of a first polarity received signal for a predetermined period of time and for providing one of first and second level signals at the second output in response to a second polarity received signal and the other of said level signals at the second output in response to the absence of a second polarity received signal for a predetermined period of time, whereby the first and second outputs of the receiving means provide combinations of first and second level signals in response to the signals provided by the transmitting means.

12. An apparatus as described in claim 11 wherein each of said first and second outputs include means for storing said one of said first and second polarity signals and biasing means for biasing the storage means to the other of said polarity signals in the absence of a polarity signal to which the particular means is responsive.

13. A system as described in claim 11 wherein the transmitting means is adapted to selectively provide a signal from a group of signals including: a substantially zero level signal, an a.c. signal and a d.c. signal.

14. A system as described in claim 11, wherein the transmitting means is adapted to selectively provide a signal from a group of signals including: an a.c. signal, a positive d.c. signal and a negative d.c. signal.

15. A system as described in claim 11, wherein the transmitting means is adapted to selectively provide a signal from a group of signals including: a substantially zero level signal, a positive d.c. signal and a negative d.c. signal.

16. A temperature control system, comprising:
   a control panel for providing a selected command signal during predetermined periods of time, said command signal being selected from a group of at least three signals selected from a group of signals comprising a substantially zero level signal, an a.c. signal, a positive d.c. signal and a negative d.c. signal; and
   temperature control apparatus responsive to said command signal for providing one of at least three different modes of operation in response to the received signal.

17. A temperature control system as described in claim 16, wherein the command signals correspond to occupied day operation, night setback operation and morning ready operation.

* * * * *